United States Patent [19]
Funada et al.

[11] Patent Number: 5,925,691
[45] Date of Patent: *Jul. 20, 1999

[54] BINDER COMPOSITION FOR MOLD AND METHOD FOR PRODUCING MOLD

[75] Inventors: Hitoshi Funada; Akira Yoshida; Wataru Mizuno; Naoki Kyochika, all of Aichi, Japan

[73] Assignee: Kao Corporation, Tokyo, Japan

[ * ] Notice: This patent is subject to a terminal disclaimer.

[21] Appl. No.: 08/579,403

[22] Filed: Dec. 27, 1995

Related U.S. Application Data

[63] Continuation of application No. 08/177,866, Jan. 4, 1994, abandoned.

[30] Foreign Application Priority Data

| Jan. 5, 1993 | [JP] | Japan | 5-015946 |
| Jan. 12, 1993 | [JP] | Japan | 5-020645 |
| Jan. 12, 1993 | [JP] | Japan | 5-020647 |

[51] Int. Cl.$^6$ .............................. B22C 1/12; B22C 1/22
[52] U.S. Cl. ................................ 523/145; 523/147
[58] Field of Search .................................. 523/145, 147

[56] References Cited

U.S. PATENT DOCUMENTS

| 3,227,686 | 1/1966 | Fitko et al. | 523/147 |
| 3,390,128 | 6/1968 | Hughes | 523/145 |
| 3,644,269 | 2/1972 | Hoyt et al. | 523/150 |
| 4,392,582 | 7/1983 | Kitamura et al. | 220/75 |
| 4,499,311 | 2/1985 | Spiro et al. | 568/660 |
| 4,529,751 | 7/1985 | Saeki | 523/145 |
| 5,068,266 | 11/1991 | Kojima et al. | 523/336 |
| 5,248,707 | 9/1993 | Gerber | 523/145 |
| 5,354,788 | 10/1994 | Johnson et al. | 523/145 |
| 5,602,192 | 2/1997 | Yoshida et al. | 523/145 |

FOREIGN PATENT DOCUMENTS

| 50-130627 | 10/1975 | Japan . |
| 61-37022 | 8/1986 | Japan . |
| 61-43132 | 9/1986 | Japan . |
| 62-40948 | 2/1987 | Japan . |
| 63-40636 | 2/1988 | Japan . |
| 1166853 | 6/1989 | Japan . |
| 2299741 | 12/1990 | Japan . |
| 3134067 | 6/1991 | Japan . |
| 5123818 | 5/1993 | Japan . |

OTHER PUBLICATIONS

Kobe Rikagaku Kogyo K.K., translation of JP 63X0636 (Feb. 1988).
Toyo Ink K.K., translation of JP 4–185625 (Jul. 1992).
Hellman et al., translation of JP6232015 (Feb. 1987).
Kotsutsumi et al., translation of JP63–037113 (Jul. 1986).
Patent Abstracts of Japan, Abstract of JP-A-57-126643 (Nov. 9, 1982).
Derwent Abstract of JP-A-53-058430.
Derwent Abstract of JP-A-56-095917.
Concise Explanation of JP-A-5-123818.

*Primary Examiner*—Jeffrey C. Mullis
*Attorney, Agent, or Firm*—Sughrue, Mion, Zinn, Macpeak & Seas, PLLC

[57] ABSTRACT

Binder compositions for a mold each comprising a specific alkaline phenol-aldehyde resin are disclosed. Methods for producing a mold using any of the binder compositions are also disclosed.

2 Claims, No Drawings

BINDER COMPOSITION FOR MOLD AND METHOD FOR PRODUCING MOLD

This is a Continuation of application Ser. No. 08/177,866 filed Jan. 4, 1994 now abandoned.

FIELD OF THE INVENTION

The present invention relates to a binder composition for use in the production of a mold, which is aimed at improving the flowability and filling properties of a mixed sand to be obtained by mixing a refractory particulate material with this binder composition. The present invention also relates to a method for producing a mold using this binder composition.

The present invention further relates to a binder composition for use in the production of a mold, more particularly a binder composition which can prevent the resulting mold from causing decrease in the strength even when the sand temperature is low and which can improve the mold strength even when a hardener is used in a small amount. The present invention furthermore relates to a method for producing a mold using this binder composition.

The present invention still further relates to a binder composition for use in the production of a mold, more particularly a binder composition which can improve the strength of the resulting mold. The present invention still furthermore relates to a method for producing a mold using this binder composition.

BACKGROUND OF THE INVENTION

Molds have conventionally been produced by mixing a refractory particulate material with a binder composition, packing the resulting mixed sand into a pattern, and then curing a binder in the binder composition. As the binder, various curable resins such as furan resins, water-soluble phenolic resins, and urethane resins have been used. Of these, water-soluble phenolic resins cure with an organic ester or carbon dioxide gas, thus they are recognized as a binder which can prevent the working atmosphere during the production of self-curing or gas-curing molds from worsening (JP-A-50-130627, JP-B-61-43132, and JP-B-61-37022). (The terms "JP-A" and "JP-B" as used herein mean an "unexamined published Japanese patent application" and an "examined Japanese patent publication", respectively.) The water-soluble phenolic resins herein means alkaline phenol-formaldehyde resins obtained by subjecting phenol and formaldehyde to polycondensation in the presence of an alkali or by adding an alkali after the polycondensation of these two compounds.

However, the production of molds from a mixed sand obtained by mixing a refractory particulate material with a binder composition containing such an alkaline phenol-formaldehyde resin has been defective in that, as compared with the case of using a binder composition containing a furan resin, the mixed sand has such poor flowability that it cannot be densely packed into a pattern. A mixed sand with poor flowability has a drawback that uniform mixing of the refractory particulate material with the binder is difficult. Further, use of a mixed sand with poor pattern-filling properties has often caused a rough surface or a reduced surface strength of the resulting mold. Accordingly, there has been a drawback that when a mold obtained using an alkaline phenol-formaldehyde resin as a binder is used in the production of a mold, the resulting cast has defects such as sand inclusion, burning, penetration, and buckle, thus causing a decrease in cast quality.

Hence, it has been proposed to incorporate, as a flow accelerator, a fluorine-compound surfactant (JP-A-2-299741) or an aliphatic alcohol (JP-A-3-134067) into a binder composition containing an alkaline phenol-formaldehyde resin. However, fluorine-compound surfactants and aliphatic alcohols have poor compatibility with alkaline phenol-formaldehyde resins and have failed to sufficiently improve the flowability of the mixed sands. In addition, fluorine-compound surfactants and aliphatic alcohols have had another drawback that they are relatively expensive, which makes the resulting casts expensive.

On the other hand, it has been proposed to use, as a binder, a phenolic resin obtained by polycondensation of formaldehyde with a bisphenol in place of phenol (JP-A-62-40948 and JP-A-63-40636). In this technique, bisphenol A, bisphenol F, bisphenol C, or the like is used alone as the bisphenol and, hence, the resulting phenolic resin is a binary polymer formed by polycondensation of the bisphenol and formaldehyde.

The strength of molds obtained using this bisphenol-formaldehyde binary polycondensation resin improves at a certain degree, but it is not yet been fully satisfactory. That is, there has been a drawback that, although a fully satisfactory mold strength is obtained when the temperature of the refractory particulate material to be mixed with the resin (sand temperature) is high, a low sand temperature results in a considerable decrease in the mold strength. The binder resin has another drawback that a considerable decrease in the mold strength is caused when the amount of a hardener is reduced.

It has also been proposed to use, as a binder, a phenolic resin obtained by polycondensation of formaldehyde with a polyhydric phenol used in place of phenol (JP-A-1-166853). However, even with the proposed technique, a sufficient improvement in the strength of molds obtained has not yet been attained.

SUMMARY OF THE INVENTION

Under these circumstances, extensive studies were made by the present inventors in order to eliminate the above-described drawbacks of alkaline phenol-formaldehyde resins in the case of mixing with a refractory particulate material. As a result, the present inventors have found that the mixed sand obtained by mixing an alkaline phenol-formaldehyde resin with a refractory particulate material can be improved in flowability and pattern-filling property by modifying the structure of the alkaline phenol-formaldehyde resin itself, that is, by producing a binder resin not by polycondensation of phenol and formaldehyde only, but by copolycondensation of these compounds and a specific phenol compound. The present invention has been accomplished based on this finding.

Accordingly, one embodiment (hereinafter referred to as the "first embodiment") of the present invention relates to a binder composition for a mold which comprises, as the main component, an alkaline phenol-aldehyde resin obtained by copolycondensation of a phenol compound represented by the following formula (1) and/or a polyhydric phenol represented by the following formula (2), an alkylphenol represented by the following formula (3), and an aldehyde compound.

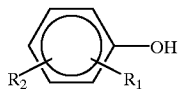

(1)

In the formula, $R_1$ and $R_2$ each represents hydrogen atom or a hydrocarbon group having 2 or less carbon atoms.

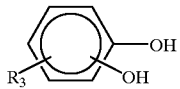

(2)

In the formula, $R_3$ represents hydrogen atom, hydroxy group or a hydrocarbon group having 2 or less carbon atoms.

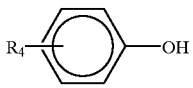

(3)

In the formula, $R_4$ represents an aliphatic hydrocarbon group or an aromatic hydrocarbon group each having 3 or more carbon atoms.

The first embodiment of the present invention also relates to a method for producing a mold which comprises mixing a refractory particulate material with this binder composition to obtain a mixed sand, packing the resulting mixed sand into a pattern, and curing the mixed sand.

The present inventors further conducted extensive studies in order to obtain a binder composition which can minimize any decrease in the strength of a mold even when the sand temperature is low or even when the amount of hardener is reduced. As a result, it has been found that when a phenolic resin which is a ternary polymer obtained by copolycondensation of a specific phenolic compound, a specific bisphenol, and an aldehyde compound is used as a binder in place of the binder which is a binary polymer obtained by polycondensation of a bisphenol and formaldehyde, decrease in the strength of the resulting mold can be minimized even if the sand temperature is low or the amount of a hardener is small. The present invention has been accomplished based on this finding.

Accordingly, another embodiment (hereinafter referred to as the "second embodiment") of the present invention relates to a binder composition for a mold which comprises, as the main component, an alkaline phenol-aldehyde resin obtained by copolycondensation of a phenolic compound represented by the following formula (1), (2) or (3), a bisphenol represented by the following formula (4), and an aldehyde compound.

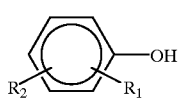

(1)

In the formula, $R_1$ and $R_2$ each represents hydrogen atom or a hydrocarbon group having 2 or less carbon atoms.

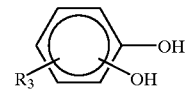

(2)

In the formula, $R_3$ represents hydrogen atom, hydroxyl group, or a hydrocarbon group having 2 or less carbon atoms.

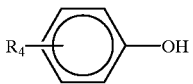

(3)

In the formula, $R_4$ represents an aliphatic hydrocarbon group or an aromatic hydrocarbon group each having 3 or more carbon atoms, preferably an aliphatic hydrocarbon group or an aromatic hydrocarbon group each having from 3 to 9 carbon atoms and more preferably an aliphatic hydrocarbon group having 3 to 9 carbon atoms.

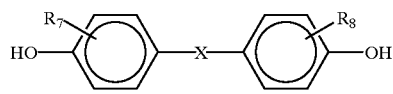

(4)

In the formula, X represents $$\begin{array}{c} R_5 \\ | \\ C \\ | \\ R_6 \end{array},$$

S, O, or $$\begin{array}{c} O \\ \| \\ S, \\ \| \\ O \end{array}$$

where $R_5$ and $R_6$ each represents hydrogen atom, trifluoromethyl group, a saturated or unsaturated alkyl group having 1 to 6 carbon atoms or a derivative thereof, or phenyl group or a derivative thereof; and $R_7$ and $R_8$ each represents hydrogen atom, a saturated or unsaturated alkyl group having 1 to 6 carbon atoms or a derivative thereof, or phenyl group or a derivative thereof.

The second embodiment of the present invention furthermore relates to a method for producing a mold which comprises mixing a refractory particulate material with this binder composition to obtain a mixed sand, packing the mixed sand into a pattern, and curing the mixed sand.

The present inventors still conducted extensive studies in order to obtain a binder composition which can sufficiently improve the strength of the resulting mold. As a result, it has been found that when a phenolic resin which is a ternary polymer obtained by the copolycondensation of a specific phenol compound, a specific polyhydric phenol, and an aldehyde compound is used as a binder in place of the binder which is a binary polymer obtained by the polycondensation of a phenol and formaldehyde, the strength of the resulting mold can be improved sufficiently. The present invention has been accomplished based on this finding.

Accordingly, still another embodiment (hereinafter referred to as the "third embodiment") of the present invention relates to a binder composition for a mold which comprises, as the main component, an alkaline phenol-aldehyde resin obtained by copolycondensation of a phenol compound represented by the following formula (1), a polyhydric phenol represented by the following formula (2), and an aldehyde compound.

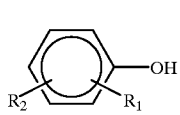

(1)

In the formula, $R_1$ and $R_2$ each represents hydrogen atom or a hydrocarbon group having 2 or less carbon atoms.

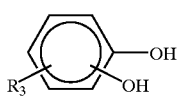

(2)

In the formula, $R_3$ represents hydrogen atom, hydroxyl group, or a hydrocarbon group having 2 or less carbon atoms.

The third embodiment of the present invention still furthermore relates to a method of producing a mold which comprises mixed a refractory particulate material with this binder composition to obtain a mixed sand, packing the mixed sand into a pattern, and curing the mixed sand.

DETAILED DESCRIPTION OF THE INVENTION

The binder composition for a mold (hereinafter sometimes referred to as the "mold-use binder composition") of the first embodiment of the present invention contains an alkaline phenol-aldehyde resin as the main component. The alkaline phenol-aldehyde resin is one obtained by the copolycondensation of a phenol compound and/or a polyhydric phenol, an alkylphenol, and an aldehyde compound. As the phenol, either one or a mixture of a phenol compound represented by the above-described formula (1) and a polyhydric phenol represented by the above-described formula (2) is used.

Examples of the phenol compound represented by formula (1) include phenol, cresol, and 3,5-xylenol.

Example of the polyhydric phenol represented by formula (2) include resorcinol and catechol.

The alkylphenol represented by the above-described formula (3) has a substituent such as an alkyl group having 3 or more carbon atoms or a phenol group mainly at the para-position. Examples thereof include nonylphenol, p-tert-butylphenol, isopropenylphenol, and phenylphenol, and they may be used either alone or a mixture of two or more of them. A mixture comprising various phenol compounds such as cashew nut shell liquid is also usable.

Examples of the aldehyde compound include formaldehyde, paraformaldehyde, furfural, and glyoxal, and they may be used either alone or a mixture of two or more of them.

In the copolycondensation of the phenol compound and/or the polyhydric phenol, the alkylphenol and the aldehyde compound, the molar proportion of each compound is preferably as follows. That is, the ratio of the molar amount of the alkylphenol to the molar amount(s) of the phenol compound and the polyhydric phenol is preferably from 0.001 to 1,000 ((the molar amount of the phenol compound and/or the polyhydric phenol):(the molar amount of the alkylphenol)=1:(0.001 to 1,000)). The ratio of the molar amount of the alkylphenol to the molar amount(s) of the phenol compound and the polyhydric phenol is more preferably from 0.01 to 90. If the ratio of the molar amount of the alkylphenol to the molar amount(s) of the phenol compound and the polyhydric phenol in an alkaline phenol-aldehyde resin is less than 0.001 or more than 1,000, there is a tendency that a mixed sand deteriorates in flowability and pattern-filling properties even when such an alkaline phenol-aldehyde resin is used. The molar amount(s) of the phenol compound and the polyhydric phenol herein means a molar amount of the phenol compound or the polyhydric phenol when the phenol compound or the polyhydric phenol is used singly, or the total molar amount of the phenol compound and the polyhydric phenol when the phenol compound and the polyhydric compound are used in combination.

Further, the ratio of the molar amount of the aldehyde compound to the total molar amount of the phenol compound, the polyhydric phenol and the alkylphenol is preferably from 1.0 to 3.0 ((the molar amount of the phenol compound+the molar amount of the polyhydric phenol+the molar amount of the phenol compound):(the molar amount of the aldehyde compound)=1:(1.0–3.0)). In particular, the ratio of the molar amount of the aldehyde compound to the total molar amount of the phenol compound, the polyhydric phenol and the alkylphenol is more preferably from 1.5 to 2.0. If the ratio of the molar amount of the aldehyde compound to the total molar amount of the phenol compound, the polyhydric phenol and the alkylphenol in the alkaline phenol-aldehyde resin is less than 1.0, there is a tendency that the strength of the resulting mold lowers. On the other hand, if the ratio of the molar amount of the aldehyde compound to the total molar amount of the phenol compound, the polyhydric compound and the alkylphenol is more than 3.0, the resulting alkaline phenol-aldehyde resin emits a strong odor of aldehyde, which may cause a fear that the working atmosphere is impaired. The molar amount(s) of the phenol compound and the polyhydric phenol in this case has the same meaning as defined above.

The copolycondensation of the phenol compound and/or the polyhydric phenol, the alkylphenol, and the aldehyde compound is generally conducted in an aqueous solution to obtain an alkaline phenol-aldehyde resin. The reaction is generally carried out at 50 to 100° C. for 1 to 24 hours. In this reaction, it is preferred that the aldehyde compound is gradually added dropwise. A preferred catalyst for use in this reaction is potassium hydroxide (KOH). Since the alkaline phenol-aldehyde resin according to the present invention is formulated into an alkaline aqueous solution, a desired amount of potassium hydroxide may be added during the copolycondensation, or a minimum amount of potassium hydroxide as a reaction catalyst may be added during the copolycondensation and then a desired amount of potassium hydroxide may be supplemented after the completion of the copolycondensation. Further, sodium hydroxide (NaOH) or lithium hydroxide (LiOH) may be added in combination with potassium hydroxide after completion of the copolycondensation so as to adjust the pH value to a desired alkalinity. In the alkaline aqueous solution of the alkaline phenol-aldehyde resin, the ratio of the molar amount of the all alkali(s) to the total molar amount of the phenol compound, the polyhydric phenol and the alkylphenol is preferably from 0.2 to 1.2. It is also preferred that the solid content, i.e., the content of the alkaline phenol-aldehyde resin without water, in the alkaline aqueous solution be from 30 to 75% by weight.

The solid content of the alkaline aqueous solution can be determined, for example, by sampling a 2.0 g portion of the solution, drying it by means of a hot air drier at 100° C. for 3 hours, and then measuring the weight of the dried matter.

The molecular weight of the alkaline phenol-aldehyde resin according to the first embodiment of the present invention is preferably from 500 to 8,000.

The molecular weight of the alkaline phenol-aldehyde resin can be measured, for example, by the following manner. First, an appropriate amount of water is added to a resin to be measured, and then $H_2SO_4$ is added to the resulting mixture to neutralize the mixture. Thereafter, the precipitate thus formed was separated out by filtration, washed with water, and dried. The dried matter was dissolved in tetrahydrofuran (THF) and then measured for its molecular weight. The measurement can be carried out by GPC method with using polystyrene as the standard.

The mold-use binder composition according to the second embodiment of the present invention contains an alkaline phenol-aldehyde resin as the main component. The alkaline phenol-aldehyde resin is obtained by the copolycondensation of a phenolic compound, a bisphenol represented by formula (4), and an aldehyde compound. Examples of the phenolic compound include the phenol compound represented by the following formula (1), the polyhydric phenol represented by the following formula (2), and the alkylphenol represented by the following formula (4). These phenolic compounds can be used either alone or a mixture of two or more of them.

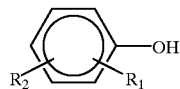

(1)

(In the formula, $R_1$ and $R_2$ each represents hydrogen atom or a hydrocarbon group having 2 or less carbon atoms.)

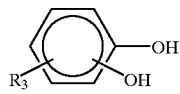

(2)

(In the formula, $R_3$ represents hydrogen atom, hydroxyl group, or a hydrocarbon group having 2 or less carbon atoms.)

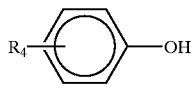

(3)

(In the formula, $R_4$ represents an aliphatic hydrocarbon group or an aromatic hydrocarbon group each having 3 or more carbon atoms, preferably an aliphatic hydrocarbon group or an aromatic hydrocarbon group each having from 3 to 9 carbon atoms and more preferably an aliphatic hydrocarbon group having 3 to 9 carbon atoms.)

Of these phenolic compounds, examples of the phenol compound represented by formula (1) include phenol, cresol, and 3,5-xylenol. Examples of the polyhydric phenol represented by formula (2) include resorcinol and catechol. Examples of the alkylphenol represented by formula (3) include nonylphenol, p-tert-butylphenol, isopropenylphenol, and phenylphenol.

Examples of the bisphenol represented by formula (4) include bisphenol A, bisphenol F, bisphenol C, bisphenol E, bisphenol Z, bisphenol S, bisphenol AF, bisphenol AP, di-sec-butylbisphenol A, diisopropylbisphenol A, 1,1-ethylidenebisphenols, methylethylmethylenebisphenols, methylisobutylmethylenebisphenols, methylhexylmethylenebisphenols, methylphenylmethylenebisphenols, and 4,4'-thiodiphenol. These may be used either alone or a mixture of two or more of them.

Examples of the aldehyde compound include formaldehyde, paraformaldehyde, furfural, and glyoxal, and they may be used either alone or a mixture of two or more of them.

In the copolycondensation of the phenolic compound(s), the bisphenol and the aldehyde compound, the molar proportion of each compound is preferably as follows. That is, the ratio of the molar amount of the aldehyde compound to the total molar amount of the phenolic compound(s) and the bisphenol is preferably from 1.0 to 5.0 ((the molar amount of the phenolic compound(s)+the molar amount of the bisphenol):(the molar amount of the aldehyde compound)= 1:(1.0 to 5.0)). In particular, the ratio of the molar amount of the aldehyde compound to the total molar amount of the phenolic compound(s) and the bisphenol is more preferably from 1.5 to 3.0. If the molar ratio of the aldehyde compound to the total of the phenolic compound(s) and the bisphenol in an alkaline phenol-aldehyde resin is less than 1.0, there is a tendency that the strength of the mold is not improved sufficiently even when such an alkaline phenol-aldehyde resin is used. On the other hand, if the molar ratio of the aldehyde compound to the total of the phenolic compound(s) and the bisphenol in an alkaline phenol-aldehyde resin is more than 5.0, the resulting alkaline phenol-aldehyde resin emits a strong odor of aldehyde, which may cause a fear that the working atmosphere is impaired. The ratio of the molar amount of the bisphenol to the molar amount of the phenolic compound(s) is preferably from about 0.001 to 1,000, more preferably from 0.01 to 90. If the ratio of the molar amount of the bisphenol to the molar amount of the phenolic compound(s) is less than 0.001 or more than 1,000, there is a tendency that the strength of the resulting mold is not improved sufficiently.

The copolycondensation of the phenolic compound(s), the bisphenol, and the aldehyde compound is generally conducted in an aqueous solution to obtain an alkaline phenol-aldehyde resin. For example, it is preferred to conduct the copolycondensation while a predetermined amount of the aldehyde compound is gradually added to an aqueous solution of predetermined amounts of the phenolic compound(s) and the bisphenol. The reaction is generally carried out at 50 to 100° C. for 1 to 24 hours. A preferred catalyst for use in this reaction is potassium hydroxide (KOH). Since the alkaline phenol-aldehyde resin according to the present invention is formulated into an alkaline aqueous solution, a desired amount of potassium hydroxide may be added during the copolycondensation, or a minimum amount of potassium hydroxide as a reaction catalyst may be added during the copolycondensation and then a desired amount of potassium hydroxide may be supplemented after the completion of the copolycondensation. Further, sodium hydroxide (NaOH) or lithium hydroxide (LiOH) may be added in combination with potassium hydroxide after the completion of the copolycondensation so as to adjust the pH value to a desired alkalinity. It is also possible to conduct the copolycondensation with using an acid catalyst and then using an alkali catalyst such as potassium hydroxide to further proceed the copolycondensation. In the alkaline aqueous solution of the alkaline phenol-aldehyde resin, the ratio of the molar amount of the all alkali(s) to the total molar amount of the hydroxyl groups of the phenolic compound(s) and the hydroxyl groups of the bisphenol is preferably from 0.2 to 1.2. It is also preferred that the concentration of the alkaline phenol-aldehyde resin in its alkaline aqueous solution be from 30 to 75% by weight.

The molecular weight of the alkaline phenol-aldehyde resin according to the second embodiment of the present invention is preferably from 500 to 8,000.

The mold-use binder composition according to the third embodiment of the present invention contains an alkaline phenol-aldehyde resin as the main component. The alkaline phenol-aldehyde resin is obtained by copolycondensation of a phenol compound, a polyhydric phenol, and an aldehyde compound. As the phenol compound, compounds represented by formula (1) described above are used either alone or a mixture of two or more of them. Examples of the phenol compound represented by formula (1) include phenol, cresol, and 3,5-xylenol. As the polyhydric phenol, compounds represented by formula (2) described above are used either alone or a mixture of two or more of them. Examples of the polyhydric phenol represented by formula (2) include resorcinol, catechol, hydroquinone, and phloroglucinol. Examples of the aldehyde compound include formaldehyde, paraformaldehyde, furfural, and glyoxal, and they may be used either alone or a mixture of two or more of them.

In the copolycondensation of the phenol compound, the polyhydric phenol, and the aldehyde compound, the molar proportion of each compound is preferably as follows. That is, the ratio of the molar amount of the polyhydric phenol to that of the phenol compound is preferably from 0.001 to 1,000 ((the molar amount of the phenol compound):(the molar amount of the polyhydric phenol)=1:(0.001 to 1,000)). In particular, the ratio of the molar amount of the polyhydric phenol to the molar amount of the phenol compound is more preferably from 0.01 to 90. If the ratio of the molar amount of the polyhydric phenol to the molar amount of the phenol compound is less than 0.001 or more than 1,000, there is a tendency that the strength of the resulting mold is not improved sufficiently.

Further, the ratio of the molar amount of the aldehyde compound to the total molar amount of the phenol compound and the polyhydric phenol is preferably from 1.0 to 3.0 ((the molar amount of the phenol compound+the molar amount of the polyhydric phenol):(the molar amount of the aldehyde compound)=1:(1.0 to 3.0)). In particular, the ratio of the molar amount of the aldehyde compound to the total molar amount of the phenol compound and the polyhydric phenol is more preferably from 1.5 to 2.0. If the molar ratio of the aldehyde compound in an alkaline phenol-aldehyde resin is less than 1.0, there is a tendency that the strength of the resulting mold is not improved sufficiently. On the other hand, if the molar ratio of the aldehyde compound is more than 3.0, the resulting alkaline phenol-aldehyde resin obtained emits a strong odor of aldehyde, which may cause a fear that the working atmosphere is impaired.

The copolycondensation of the phenol compound, the polyhydric phenol, and the aldehyde compound is generally conducted in an aqueous solution to obtain an alkaline phenol-aldehyde resin. The reaction is generally conducted at 50 to 100° C. for 1 to 24 hours. In this reaction, it is preferred that the aldehyde compound is gradually added dropwise. A preferred catalyst for use in this reaction is potassium hydroxide (KOH). Since the alkaline phenol-aldehyde resin according to the present invention is formulated into an alkaline aqueous solution, a desired amount of potassium hydroxide may be added during the copolycondensation, or a minimum amount of potassium hydroxide as a reaction catalyst may be added during the copolycondensation and then a desired amount of potassium hydroxide may be supplemented after the completion of the copolycondensation. Further, sodium hydroxide (NaOH) or lithium hydroxide (LiOH) may be added in combination with potassium hydroxide after the completion of the copolycondensation so as to adjust the pH value to a desired alkalinity. It is also possible to conduct the copolycondensation with using an acid catalyst and then using an alkali catalyst such as potassium hydroxide to further proceed the copolycondensation. In the alkaline aqueous solution of the alkaline phenol-aldehyde resin, the ratio of the molar amount of the all alkali(s) to the total molar amount of the phenol compound and the polyhydric phenol is preferably from 0.2 to 1.2. It is also preferred that the concentration of the alkaline phenol-aldehyde resin in its alkaline aqueous solution be from 30 to 75% by weight.

In the copolycondensation to obtain the alkaline phenol-aldehyde resin according to the first, second or third embodiment of the present invention, an alcohol may exist in the reaction system. By addition of an alcohol in the reaction system for producing the alkaline phenol-aldehyde resin according to the present invention, the flowability and the filling property of the resulting mixed sand can be further improved.

Examples of the alcohol include a monohydric alcohol having 2 to 10 carbon atoms such as ethyl alcohol, propyl alcohol, isopropyl alcohol, butyl alcohol, isobutyl alcohol, sec-butyl alcohol, tert-butyl alcohol, n-amyl alcohol, isoamyl alcohol, hexyl alcohol, heptyl alcohol, octyl alcohol, capryl alcohol, nonyl alcohol, and decyl alcohol. These alcohols may be used either solely or a combination of two or more of them.

The alcohol is preferably used in such an amount that the ratio of the molar amount of the alcohol to the total molar amount of the phenolic compounds is 0.0001 to 0.5. In this instance, the phenolic compounds mean the phenol compound, the polyhydric phenol and the alkylphenol in the first embodiment of the present invention, the phenolic compound(s) and the bisphenol in the second embodiment of the present invention, and the phenol compound and the polyhydric compound in the third embodiment of the present invention.

The mold-use binder composition according to the first, second and third embodiment of the present invention, which comprises the alkaline phenol-aldehyde resin as the main component, may further contain other ingredients such as the following. For example, it is preferable to incorporate a silane coupling agent for further improving the resulting mold. As the silane coupling agent, any of conventionally known ones of various kinds can be used. Specifically, γ-glycidoxypropyltrimethoxysilane, γ-aminopropyltriethoxy-silane, γ-(2-aminoethyl) aminopropyltrimethoxysilane, N-glycidyl-N,N-bis[3-(trimethoxysilyl)propyl]amine, or the like may be used.

The flowability and pattern-filling properties of a mixed sand to be obtained by mixing a refractory particulate material with the mold-use binder composition according to the present invention can be further improved by incorporating, into the composition, any of various surfactants including nonionic surfactants, cationic surfactants, anionic surfactants, and ampholytic surfactants or an organic nitrogen compound such as urea, a urea compound, or an amide compound. In the case of using a regenerated sand as the refractory particulate material, the strength of the resulting mold can be improved by incorporating any of various salts of polyvalent metals, such as calcium chloride and aluminum oxide, into the mold-use binder composition.

For producing a mold using the mold-use binder composition according to the present invention, either a method of forming a self-curing mold or a method of forming a gas-curing mold may generally be employed. In an example of the method of forming a self-curing mold, 0.1 to 5 parts by weight of an organic ester is added to 100 parts by weight of a refractory particulate material and the mixture is mixed. Thereto is then added 0.4 to 15 parts by weight, preferably 0.6 to 5 parts by weight, of the mold-use binder composition according to the present invention in the form of an alkaline aqueous solution. The resulting mixture is mixed again. The mixed sand thus obtained is packed in a pattern and allowed to stand, whereby the sand cures to give a self-cured mold. In an example of the method of forming a gas-curing mold, 0.4 to 15 parts by weight, preferably 0.6 to 5 parts by weight, of the mold-use binder composition according to the present invention is added, in the form of an alkaline aqueous solution, to 100 parts by weight of a refractory particulate material, and the mixture is mixed. The resulting mixed sand is packed in a pattern for gas curing by means of blowing with compressed air. The sand is then cured by blowing 0.05 to 10 parts by weight of a gaseous or aerosol-form organic ester into the sand, thereby giving a gas-cured mold. As the organic ester, an alkyl formate in which the alkyl group has 1 to 3 carbon atoms, preferably methyl formate can be used. In the case where carbon dioxide gas is employed in place of the gaseous organic ester for curing the mold-use binder composition, a compound having an oxy anion, such as boric acid, a borate, or an aluminate, may be added in an appropriate amount to the binder composition to cure the alkaline phenol-aldehyde resin by the co-action of the compound having an oxy anion and carbon dioxide gas (JP-A-1-224263).

As the refractory particulate material for use in producing a mold, any of conventionally known ones of various kinds can be employed. Examples thereof include silica sand mainly composed of quartz, chromite sand, zircon sand, olivine sand, alumina sand, mullite sand, and synthetic mullite sand. It is a matter of course that a sand mainly composed of one obtained by regenerating or recovering any of these sands can be used as the refractory particulate material.

The present invention will be explained below in more detail by reference to the following examples, but the invention is not construed as being limited thereto.

[Preparation of Mold-use Binder Composition Aqueous Solutions 1-1]

To a 50% aqueous solution of potassium hydroxide were added a phenol compound and/or a polyhydric phenol and an alkyl phenol in respective amounts determined by the molar ratio shown in Table 1-1. The resulting mixture was stirred to dissolve the compounds. While this solution was maintained at 80° C., an aldehyde compound was gradually added in an amount determined by the molar ratio shown in Table 1-1. The reaction was then continued at 80° C. until the weight-average molecular weight of the alkaline phenol-aldehyde resin in the reaction mixture reached 2,500. The time at which the weight-average molecular weight had reached 2,500 was determined from measurements of the viscosity of the reaction mixture. After completion of the reaction, the reaction mixture was cooled to room temperature, and 50% aqueous potassium hydroxide solution was then added thereto in such an amount that the ratio of the molar amount of the potassium hydroxide to the total molar amount of the phenol compound, the polyhydric phenol and the alkylphenol became 0.85. Thus, an alkaline aqueous solution of an alkaline phenol-aldehyde resin was obtained. To this aqueous solution was added 0.5 part by weight of γ-glycidoxypropyltrimethoxysilane per 100 parts by weight of the solution. In the manner described above, seven mold-use binder composition aqueous solutions were prepared. In each binder composition aqueous solution, the solid content of the binder composition was 50% by weight.

TABLE 1-1

| Example | Phenol Compound and/or Polyhydric Phenol | Alkylphenol | Aldehyde Compound | Molar ratio a | Molar ratio b | Compactability (mm) |
| --- | --- | --- | --- | --- | --- | --- |
| Example 1 | phenol | p-tert-butyl phenol | formaldehyde | 1.0 | 0.001 | 26.3 |
| Example 2 | " | p-tert-butyl phenol | " | 1.5 | 0.400 | 26.5 |
| Example 3 | " | p-tert-butyl phenol | " | 3.0 | 990 | 26.9 |
| Example 4 | m-cresol | nonylphenol | " | 1.5 | 0.400 | 25.1 |
| Example 5 | 3,5-xylenol | isopropenyl-phenol | formaldehyde/furfural = 9/1 | 1.5 | 50 | 27.0 |
| Example 6 | resorcinol | nonylphenol | formaldehyde | 2.0 | 0.400 | 25.3 |
| Example 7 | " | phenylphenol | " | 2.0 | 50 | 26.1 |
| Comparative Example 1 | phenol | — | " | 1.5 | — | 29.1 |

In Table 1-1, the item a indicates the ratio of the molar amount of the aldehyde compound to the total molar amount of the phenol compound, the polyhydric phenol and the alkylphenol (i.e., (the molar amount of the aldehyde compound)/(the molar amount of the polyhydric phenol+the molar amount of the alkylphenol)). The item b indicates the ratio of the molar amount of the alkylphenol to that of the phenol compound and the polyhydric phenol (i.e., (the molar amount of the alkylphenol)/(the molar amount of the phenol compound+ the molar amount of the polyhydric phenol)). The a's and b's appearing in the tables that will be given hereinafter are as defined above.

[Preparation of Mold-use Binder Composition Aqueous Solutions 1-2]

Seven mold-use binder composition aqueous solutions 1-2 were prepared by the same method as that for the mold-use binder composition aqueous solutions 1-1 except that the reaction was continued until the weight-average molecular weight of the alkaline phenol-aldehyde resin in the reaction mixture reached 1,800.

[Preparation of Mold-use Binder Composition Aqueous Solutions 1-3]

A 25 parts by weight portion of each of the aqueous solutions of an alkaline phenol-aldehyde resin which had been obtained after the completion of the reaction in the preparation of the mold-use binder composition aqueous solutions 1-2 was mixed with 5 parts by weight of sodium tetraborate decahydrate and 5 parts by weight of 50% potassium hydroxide. Thus, seven mold-use binder composition aqueous solutions 1-3 were obtained.

[Preparation of Mold-use Binder Composition Aqueous Solution 1-4]

Phenol was added to a 50% aqueous solution of potassium hydroxide and dissolved therein with stirring. While this solution was maintained at 80° C., formaldehyde was gradually added in such an amount that the ratio of the molar amount of the formaldehyde to that of the phenol became 1.5. The reaction was then continued at 80° C. until the weight-average molecular weight of the phenol-formaldehyde resin in the reaction mixture reached 2,500. The time at which the weight-average molecular weight had reached 2,500 was determined from measurements of the viscosity of the reaction mixture. After completion of the reaction, the reaction mixture was cooled to room temperature, and 50% aqueous potassium hydroxide solution was then added in such an amount that the ratio of the molar amount of the potassium hydroxide to that of the phenol became 0.85. Thus, an alkaline aqueous solution of a phenol-formaldehyde resin was obtained. To this aqueous solution was added 0.5 part by weight of γ-glycidoxypropyltrimethoxysilane per 100 parts by weight of the solution. In this way, one mold-use binder composition aqueous solution was prepared. In the binder composition aqueous solution, the solid content of the binder composition (the phenol-formaldehyde resin and the silane coupling agent) was 50% by weight.

[Preparation of Mold-use Binder Composition Aqueous Solution 1-5]

One mold-use binder composition aqueous solution 1-5 was prepared by the same method as that for the mold-use binder composition aqueous solution 1-4 except that the reaction was continued until the weight-average molecular weight of the phenol-formaldehyde resin in the reaction mixture reached 1,800.

[Preparation of Mold-use Binder Composition Aqueous Solution 1-6]

A 25 parts by weight portion of the aqueous phenol-formaldehyde resin solution obtained after the completion of the reaction in the preparation of the mold-use binder composition aqueous solution 1-5 was mixed with 5 parts by weight of sodium tetraborate decahydrate and 5 parts by weight of 50% potassium hydroxide. Thus, one mold-use binder composition aqueous solution 1-6 was obtained.

EXAMPLES 1 TO 7

To 100 parts by weight of silica sand as a refractory particulate material was added 0.3 part by weight of triacetin as a hardener. The resulting mixture was mixed. Thereto was then added 1.5 parts by weight of each of the seven mold-use binder composition aqueous solutions 1-1 prepared beforehand. The resulting mixtures each was mixed to obtain seven mixed sands. The mixed sands were evaluated for their flowability and filling properties by the following method. That is, a test cylinder having an inner diameter of 50 mm and an effective inner length of 100 mm was provided with a support plate at its bottom, and each mixed sand was roughly packed into the test cylinder through a screen having 3 mm mesh. The excess mixed sand above the brim was then scraped off, and the resulting test cylinder was treated with a compactability tester manufactured by George Fischer Ltd. to compact the mixed sand at a squeeze pressure of 10 kg/cm$^2$. The resulting decrease in the height of the mixed sand was measured; this height decrease, X mm (=C.B. (compactability)), was regarded as a measure of the flowability and filling properties of the mixed sand. The results obtained are shown in Table 1-1. Lower values of X indicate that the mixed sands have better flowability and filling properties.

COMPARATIVE EXAMPLE 1

A mixed sand was obtained in the same manner as in Example 1 except that the mold-use binder composition aqueous solution 1-4 was used in place of the mold-use binder composition aqueous solution 1-1. This mixed sand was evaluated for C.B. The results obtained are also shown in Table 1-1.

EXAMPLES 8 TO 14

To 100 parts by weight of silica sand as a refractory particulate material was added 2.0 parts by weight of each of the seven mold-use binder composition aqueous solutions 1-2 prepared beforehand. The resulting mixtures each was mixed to obtain seven mixed sands. Each mixed sand was evaluated for C.B. in the same manner as in Example 1. The results obtained are shown in Table 1-2. In Table 1-2, the kinds of the phenol compound and/or the polyhydric phenol and others are specified as in Table 1-1.

COMPARATIVE EXAMPLE 2

A mixed sand was obtained in the same manner as in Example 8 except that the mold-use binder composition aqueous solution 1-5 was used in place of the mold-use binder composition aqueous solution 1-2. This mixed sand was evaluated for C.B. The results obtained are also shown in Table 1-2.

TABLE 1-2

| Example | Phenol Compound and/or Polyhydric Phenol | Alkyl-Phenol | Aldehyde-Compound | Molar ratio a | b | Compactability (mm) |
|---|---|---|---|---|---|---|
| Example 8 | phenol | p-tert-butyl phenol | formaldehyde | 1.0 | 0.001 | 23.1 |
| Example 9 | " | p-tert-butyl phenol | " | 1.5 | 0.400 | 23.3 |
| Example 10 | " | p-tert-butyl phenol | " | 3.0 | 990 | 23.2 |
| Example 11 | m-cresol | nonylphenol | " | 1.5 | 0.400 | 22.1 |
| Example 12 | 3.5-xylenol | isopropenyl-phenol | formaldehyde/furfural = 9/1 | 1.5 | 50 | 23.5 |
| Example 13 | resorcinol | nonylphenol | formaldehyde | 2.0 | 0.400 | 23.6 |
| Example 14 | " | phenylphenol | " | 2.0 | 50 | 24.0 |
| Comparative Example 2 | phenol | — | " | 1.5 | — | 26.4 |

EXAMPLES 15 TO 21

To 100 parts by weight of silica sand as a refractory particulate material was added 3.0 parts by weight of each of the seven mold-use binder composition aqueous solutions 1-3 prepared beforehand. Each of the resulting mixtures was mixed to obtain seven mixed sands. Each mixed sand was evaluated for C.B. in the same manner as in Example 1. The results obtained are shown in Table 1-3. In Table 1-3, the kinds of phenol compound and/or the polyhydric phenol and others are specified as in Table 1-1.

COMPARATIVE EXAMPLE 3

A mixed sand was obtained in the same manner as in Example 15 except that the mold-use binder composition aqueous solution 1-6 was used in place of the mold-use binder composition aqueous solution 1-3. This mixed sand was evaluated for C.B. The results obtained are also shown in Table 1-3.

The results in Tables 1-1 to 1-3 clearly show that when an alkaline phenol-aldehyde resin obtained by the copolycondensation of three kinds of the compounds, i.e., a phenol compound and/or a polyhydric phenol, an alkylphenol, and an aldehyde compound, is used as the main component of a binder composition to obtain a mixed sand, the resulting mixed sand has a lower value of C.B. than a mixed sand obtained using a binder composition containing as the main component a phenol-formaldehyde resin produced by the polycondensation of phenol and formaldehyde. Thus, the mixed sands obtained by the methods of Examples 1 to 21 are superior in the flowability and pattern-filling property to the mixed sands obtained by the methods of Comparative Examples 1 to 3.

[Preparation of Mold-use Binder Composition Aqueous Solutions 2-1]

To a 50% aqueous solution of potassium hydroxide were added a phenolic compound and a bisphenol in respective amounts determined by the molar ratio shown in Table 2-3. The resulting mixture was stirred to dissolve the compounds. While this solution was maintained at 80° C., an aldehyde compound was gradually added in an amount determined by the molar ratio shown in Table 2-3. The reaction was then continued at 80° C. until the weight-average molecular weight of the alkaline phenol-aldehyde resin in the reaction mixture reached 2,500. The time at which the weight-average molecular weight had reached 2,500 was determined from measurements of the viscosity of the reaction mixture. After completion of the reaction, the reaction mixture was cooled to room temperature, and 50% aqueous potassium hydroxide solution was then added in such an amount that the ratio of the molar amount of the potassium hydroxide to the total molar amount of the phenolic compound and the bisphenol became 0.85. Thus, an alkaline aqueous solution of an alkaline phenol-aldehyde resin was obtained. To this aqueous solution was added 0.5 part by weight of γ-glycidoxypropyltrimethoxysilane per 100 parts by weight of the solution. In the manner described

TABLE 1-3

| Example | Phenol Compound and/or Polyhydric Phenol | Alkyl-phenol | Aldehyde Compound | Molar ratio a | b | Compactability (mm) |
|---|---|---|---|---|---|---|
| Example 15 | phenol | p-tert-butyl phenol | formaldehyde | 1.0 | 0.001 | 23.3 |
| Example 16 | " | p-tert-butyl phenol | " | 1.5 | 0.400 | 23.4 |
| Example 17 | " | p-tert-butyl phenol | " | 3.0 | 990 | 23.4 |
| Example 18 | m-cresol | nonylphenol | " | 1.5 | 0.400 | 22.2 |
| Example 19 | 3,5-xylenol | isopropenyl-phenol | formaldehyde/furfural = 9/1 | 1.5 | 50 | 23.4 |
| Example 20 | resorcinol | nonylphenol | formaldehyde | 2.0 | 0.400 | 23.8 |
| Example 21 | " | phenylphenol | " | 2.0 | 50 | 24.2 |
| Comparative Example 3 | phenol | " | " | 1.5 | — | 27.0 | above, ten mold-use binder composition aqueous solutions were prepared. In each aqueous binder composition solution, the content of the binder composition (the alkaline phenol-aldehyde resin and the silane coupling agent) was 50% by weight.

In Table 2-3, the item c indicates the ratio of the molar amount of the aldehyde compound to the total molar amount of the phenolic compound and the bisphenol, i.e., ((the molar amount of the aldehyde compound)/(the molar amount of the phenolic compound+the molar amount of the bisphenol)). The item d indicates the ratio of the molar amount of the bisphenol to that of the phenolic compound, i.e., ((the molar amount of the bisphenol)/(the molar amount of the phenolic compound)). The c's and d's appearing in the tables that will be given hereinafter are as defined above.

[Preparation of Mold-use Binder Composition Aqueous Solutions 2-2]

Four mold-use binder composition aqueous solutions 2-2 were prepared by the same method as that for the mold-use binder composition aqueous solutions 2-1 except that the molar proportions of the phenolic compound, the bisphenol, and the aldehyde compound were changed to those shown in Table 2-1 and that the reaction was continued until the weight-average molecular weight of the alkaline phenol-aldehyde resin in the reaction mixture reached 1,800.

[Preparation of Mold-use Binder Composition Aqueous Solutions 2-3]

A 25 parts by weight portion of each of the aqueous solutions of an alkaline phenol-aldehyde resin which had been obtained the after completion of the reaction in the preparation of the mold-use binder composition aqueous solutions 2-2 was mixed with 5 parts by weight of sodium tetraborate decahydrate and 5 parts by weight of 50% potassium hydroxide. Thus, four mold-use binder composition aqueous solutions 2-3 were obtained.

[Preparation of Mold-use Binder Composition Aqueous Solution 2-4]

Phenol was added to a 50% aqueous solution of potassium hydroxide and dissolved therein with stirring. While this solution was maintained at 80° C., formaldehyde was gradually added in such an amount that the ratio of the molar amount of the formaldehyde to that of the phenol became 1.5. The reaction was then continued at 80° C. until the weight-average molecular weight of the phenol-formaldehyde resin in the reaction mixture reached 2,500. After completion of the reaction, the reaction mixture was cooled to room temperature, and 50% aqueous potassium hydroxide solution was then added in such an amount that the ratio of the molar amount of the potassium hydroxide to that of the phenol became 0.85. Thus, an alkaline aqueous solution of a phenol-formaldehyde resin was obtained. To this aqueous solution was added 0.5 part by weight of γ-glycidoxypropyltrimethoxysilane per 100 parts by weight of the solution. In this way, one mold-use binder composition aqueous solution was prepared. In the binder composition aqueous solution, the content of the binder composition (the phenol-formaldehyde resin and the silane coupling agent) was 50% by weight.

[Preparation of Mold-use Binder Composition Aqueous Solution 2-5]

Bisphenol A was added to a 50% aqueous solution of potassium hydroxide and dissolved therein with stirring. While this solution was maintained at 80° C., formaldehyde was gradually added in such an amount that the ratio of the molar amount of the formaldehyde to that of the bisphenol A became 3.0. The reaction was then continued at 80° C. until the weight-average molecular weight of the bisphenol A-formaldehyde resin in the reaction mixture reached 2,500. After the completion of the reaction, the reaction mixture was cooled to room temperature, and 50% aqueous potassium hydroxide solution was then added in such an amount that the ratio of the molar amount of the potassium hydroxide to that of the bisphenol A became 0.85. Thus, an alkaline aqueous solution of a bisphenol A-formaldehyde resin was obtained. To this aqueous solution was added 0.5 part by weight of γ-glycidoxypropyltrimethoxysilane per 100 parts by weight of the solution. In this way, one mold-use binder composition aqueous solution was prepared. In the binder composition aqueous solution, the content of the binder composition (the bisphenol A-formaldehyde resin and the silane coupling agent) was 50% by weight.

[Preparation of Mold-use Binder Composition Aqueous Solution 2-6]

One mold-use binder composition aqueous solution 2-6 was prepared by the same method as that for the mold-use binder composition aqueous solution 2-4 except that the reaction was continued until the weight-average molecular weight of the phenol-formaldehyde resin in the reaction mixture reached 1,800.

[Preparation of Mold-use Binder Composition Aqueous Solution 2-7]

One mold-use binder composition aqueous solution 2-7 was prepared by the same method as that for the mold-use binder composition aqueous solution 2-5 except that the reaction was continued until the weight-average molecular weight of the bisphenol A-formaldehyde resin in the reaction mixture reached 1,800.

[Preparation of Mold-use Binder Composition Aqueous Solution 2-8]

A 25 parts by weight portion of the phenol-formaldehyde resin aqueous solution obtained after the completion of the reaction in the preparation of the mold-use binder composition aqueous solution 2-6 was mixed with 5 parts by weight of sodium tetraborate decahydrate and 5 parts by weight of 50% potassium hydroxide. Thus, one mold-use binder composition aqueous solution 2-8 was obtained.

[Preparation of Mold-use Binder Composition Aqueous Solution 2-9]

A 25 parts by weight portion of the bisphenol A-formaldehyde resin aqueous solution obtained after the completion of the reaction in the preparation of the mold-use binder composition aqueous solution 2-7 was mixed with 5 parts by weight of sodium tetraborate decahydrate and 5 parts by weight of 50% potassium hydroxide. Thus, one mold-use binder composition aqueous solution 2-9 was obtained.

EXAMPLES 22 TO 25

To 100 parts by weight of silica sand (sand temperature: 10° C. or 35° C.) as a refractory particulate material was added 2.0 parts by weight of each of the four mold-use binder composition aqueous solutions 2-2 prepared beforehand. Each of the resulting mixture was mixed to obtain four mixed sands. Each mixed sand was packed in a test piece frame for gas curing which has a diameter of 50 mm and a height of 50 mm, and 1.2 parts by weight of methyl formate was injected thereinto per 100 parts by weight of the silica sand to thereby produce a mold by the gas curing method. The compression strength ($kg/cm^2$) of each of the thus-produced molds was measured at 24 hours after the production. The results obtained are shown in Table 2-1. The degrees of compression strength decrease were also determined and the results are shown in Table 2-1. The degree of compression strength decrease was calculated using the equation: ((compression strength of mold after 24 hours at a sand temperature of 35° C.—compression strength of mold after 24 hours at a sand temperature of 10° C.)/(compression strength of mold after 24 hours at a sand temperature of 35° C.))×100. The degree of compression strength decrease in Table 2-2 was also calculated using this equation.

COMPARATIVE EXAMPLES 4 TO 7

Molds were obtained in the same manner as in Example 22 except that in place of the mold-use binder composition aqueous solution 2-2, the mold-use binder composition aqueous solution 2-6 (Comparative Example 4), the mold-use binder composition aqueous solution 2-7 (Comparative Example 5), or a mixture of the mold-use binder composition aqueous solutions 2-6 and 2-7 (Comparative Examples 6 and 7) was used. The molds obtained were evaluated for compression strength (kg/cm$^2$) after 24 hours and other properties in the same manner as in Example 22. The results obtained are also shown in Table 2-1.

hand. Each of the resulting mixtures was mixed to obtain four mixed sands. Each mixed sand was packed in a test piece frame for gas curing which has a diameter of 50 mm and a height of 50 mm, and carbon dioxide gas was passed therethrough for 2 minutes at a flow rate of 10 l/min to thereby produce a mold by the gas curing method. The molds were evaluated for compression strength (kg/cm$^2$) after 24 hours and other properties in the same manner as in Example 22. The results obtained are shown in Table 2-2. In Table 2-2, the kinds of bisphenols and others are specified as in Table 2-1.

COMPARATIVE EXAMPLES 8 TO 11

Molds were obtained in the same manner as in Example 26 except that in place of the mold-use binder composition aqueous solution 2-3, the mold-use binder composition aqueous solution 2-8 (Comparative Example 8), the mold-use binder composition aqueous solution 2-9 (Comparative Example 9), or a mixture of the mold-use binder composi-

TABLE 2-1

| Example | Phenolic Compound | Bisphenol | Aldehyde Compound | Molar Ratio c | Molar Ratio d | Sand Temperature (°C.) | Compression Strength | Degree of Strength Decrease (%) |
|---|---|---|---|---|---|---|---|---|
| Example 22 | phenol | bisphenol A | formaldehyde | 2.0 | 0.400 | 35 | 38.5 | 17.4 |
|  |  |  |  |  |  | 10 | 31.8 |  |
| Example 23 | p-tert-butyl phenol | " | " | 2.0 | 50 | 35 | 38.7 | 18.1 |
|  |  |  |  |  |  | 10 | 31.7 |  |
| Example 24 | m-cresol | bisphenol F | " | 2.0 | 100 | 35 | 41.2 | 19.2 |
|  |  |  |  |  |  | 10 | 33.3 |  |
| Example 25 | phenol | bisphenol A | formaldehyde/furfural = 9/1 | 2.0 | 0.400 | 35 | 23.1 | 16.0 |
|  |  |  |  |  |  | 10 | 19.4 |  |
| Comparative Example 4 | phenol | — | formaldehyde | 1.5 | — | 35 | 35.5 | 19.4 |
|  |  |  |  |  |  | 10 | 28.6 |  |
| Comparative Example 5 | — | bisphenol A | " | 3.0 | — | 35 | 43.1 | 48.7 |
|  |  |  |  |  |  | 10 | 22.1 |  |
| Comparative Example 6 | Phenol-aldehyde resin comprising a mixture of 100 parts by weight of the resin of Comparative Example 4 and 25 parts by weight of the resin of Comparative Example 5 |  |  |  |  | 35 | 39.1 | 29.7 |
|  |  |  |  |  |  | 10 | 27.5 |  |
| Comparative Example 7 | Phenol-aldehyde resin comprising a mixture of 100 parts by weight of the resin of Comparative Example 4 and 400 parts by weight of the resin of Comparative Example 5 |  |  |  |  | 35 | 40.2 | 44.0 |
|  |  |  |  |  |  | 10 | 22.5 |  |

EXAMPLES 26 TO 29

To 100 parts by weight of silica sand (sand temperature: 10° C. or 35° C.) as a refractory particulate material was added 3.0 parts by weight of each of the four mold-use binder composition aqueous solutions 2-3 prepared beforetion aqueous solutions 8 and 9 (Comparative Examples 10 and 11) was used. The molds obtained were evaluated for compression strength (kg/cm$^2$) after 24 hours and other properties in the same manner as in Example 26. The results obtained are also shown in Table 2-2.

TABLE 2-2

| Example | Phenolic Compound | Bisphenol | Aldehyde Compound | Molar Ratio c | Molar Ratio d | Sand Temperature (°C.) | Compression Strength | Degree of Strength Decrease (%) |
|---|---|---|---|---|---|---|---|---|
| Example 26 | phenol | bisphenol A | formaldehyde | 2.0 | 0.400 | 35 | 23.7 | 12.2 |
|  |  |  |  |  |  | 10 | 23.7 |  |
| Example 27 | p-tert-butyl-phenol | " | " | 2.0 | 50 | 35 | 30.2 | 14.2 |
|  |  |  |  |  |  | 10 | 25.9 |  |
| Example 28 | m-cresol | bisphenol F | " | 2.0 | 100 | 35 | 31.8 | 15.1 |
|  |  |  |  |  |  | 10 | 27.0 |  |
| Example 29 | phenol | bisphenol A | formaldehyde/furfural = 9/1 | 2.0 | 0.400 | 35 | 25.7 | 15.2 |
|  |  |  |  |  |  | 10 | 21.8 |  |
| Comparative Example 8 | phenol | — | formaldehyde | 1.5 | — | 35 | 20.1 | 15.4 |
|  |  |  |  |  |  | 10 | 17.0 |  |

TABLE 2-2-continued

| Example | Phenolic Compound | Bisphenol | Aldehyde Compound | Molar Ratio c | d | Sand Temperature (°C.) | Compression Strength | Degree of Strength Decrease (%) |
|---|---|---|---|---|---|---|---|---|
| Comparative Example 9 | — | bisphenol A | " | 3.0 | — | 35<br>10 | 23.3<br>12.5 | 46.5 |
| Comparative Example 10 | Phenol-aldehyde resin comprising a mixture of 100 parts by weight of the resin of Comparative Example 8 and 25 parts by weight of the resin of Comparative Example 9 | | | | | 35<br>10 | 21.6<br>15.6 | 27.8 |
| Comparative Example 11 | Phenol-aldehyde resin comprising a mixture of 100 parts by weight of the resin of Comparative Example 8 and 400 parts by weight of the resin of Comparative Example 9 | | | | | 35<br>10 | 22.8<br>13.1 | 42.5 |

EXAMPLES 30 TO 39

To 100 parts by weight of silica sand (sand temperature: 25° C.) as a refractory particulate material was added triacetin as a hardener in each of the amounts shown in Table 2-3. The resulting mixtures were mixed. To each of the mixtures was then added 1.5 parts by weight of each of the ten mold-use binder composition aqueous solutions 2-1 prepared beforehand. Each of the resulting mixtures was mixed to obtain ten mixed sands. Each mixed sand was packed in a test piece frame having a diameter of 50 mm and a height of 50 mm to thereby produce a mold by the self-curing method. The molds thus obtained were evaluated for compression strength (kg/cm$^2$) after 24 hours and other properties in the same manner as in Example 22. The results obtained are shown in Table 2-3. The degree of compression strength decrease was calculated using the equation: ((compression strength of mold using larger amount of hardener amount—compression strength of mold using smaller amount of hardener amount)/(compression strength of mold using larger amount of hardener))×100. The degrees of compression strength decrease in Tables 2-4 to 2-6 were also calculated using this equation.

COMPARATIVE EXAMPLES 12 TO 15

Molds were obtained in the same manner as in Example 30 except that in place of the mold-use binder composition aqeous solution 2-1, the mold-use binder composition aqueous solution 2-4 (Comparative Example 12), the mold-use binder composition aqueous solution 2-5 (Comparative Example 13), or a mixture of the mold-use binder composition aqueous solutions 4 and 5 (Comparative Examples 14 and 15) was used. The molds obtained were evaluated for compression strength (kg/cm$^2$) after 24 hours and other properties in the same manner as in Example 22. The results obtained are shown in Table 2-4.

TABLE 2-3

| Example | Phenolic Compound | Bisphenol | Aldehyde Compound | Molar Ratio c | d | Hardener Amount (parts by weight) | Compression Strength | Degree of Strength Decrease (%) |
|---|---|---|---|---|---|---|---|---|
| Example 30 | phenol | bisphenol A | formaldehyde | 1.0 | 0.001 | 0.40<br>0.25 | 32.3<br>30.8 | 4.6 |
| Example 31 | phenol | bisphenol A | formaldehyde | 2.0 | 0.400 | 0.40<br>0.25 | 40.2<br>38.1 | 5.2 |
| Example 32 | phenol | bisphenol A | formaldehyde | 5.0 | 990 | 0.40<br>0.25 | 43.5<br>39.5 | 9.2 |
| Example 33 | phenol | bisphenol A | formaldehyde/furfural = 9/1 | 2.0 | 50 | 0.40<br>0.25 | 39.2<br>35.4 | 9.7 |
| Example 34 | p-tert-butylphenol | bisphenol A | formaldehyde | 2.0 | 50 | 0.40<br>0.25 | 35.0<br>31.9 | 8.9 |
| Example 35 | m-cresol | bisphenol F | formaldehyde | 2.0 | 100 | 0.40<br>0.25 | 36.0<br>32.8 | 8.8 |
| Example 36 | phenol | bisphenol C | formaldehyde | 2.0 | 0.9 | 0.40<br>0.25 | 29.8<br>27.7 | 7.0 |
| Example 37 | phenol | bisphenol E | formaldehyde | 2.0 | 0.9 | 0.40<br>0.25 | 31.8<br>29.5 | 7.2 |
| Example 38 | nonylphenol | bisphenol A | formaldehyde | 2.0 | 4.0 | 0.40<br>0.25 | 32.5<br>29.7 | 8.6 |
| Example 39 | resorcinol | bisphenol Z | formaldehyde | 2.0 | 4.0 | 0.40<br>0.25 | 32.0<br>29.1 | 9.1 |

TABLE 2-4

| Example | Phenolic Compound | Bisphenol | Aldehyde Compound | Molar Ratio c | Molar Ratio d | Hardener Amount (parts by weight) | Compression Strength | Degree of Strength Decrease (%) |
|---|---|---|---|---|---|---|---|---|
| Comparative Example 12 | phenol | — | formaldehyde | 1.5 | — | 0.40 | 28.2 | 10.3 |
|  |  |  |  |  |  | 0.25 | 25.3 |  |
| Comparative Example 13 | — | bisphenol A | " | 3.0 | — | 0.40 | 44.0 | 28.0 |
|  |  |  |  |  |  | 0.25 | 31.7 |  |
| Comparative Example 14 | Phenol-aldehyde resin comprising a mixture of 100 parts by weight of the resin of Comparative Example 12 and 25 parts by weight of the resin of Comparative Example 13 | | | | | 0.40 | 34.2 | 14.9 |
|  |  |  |  |  |  | 0.25 | 29.1 |  |
| Comparative Example 15 | Phenol-aldehyde resin comprising a mixture of 100 parts by weight of the resin of Comparative Example 12 and 400 parts by weight of the resin of Comparative Example 13 | | | | | 0.40 | 41.2 | 21.6 |
|  |  |  |  |  |  | 0.25 | 32.3 |  |

EXAMPLES 40 TO 43

To 100 parts by weight of silica sand (sand temperature: 35° C.) as a refractory particulate material was added 2.0 parts by weight of each of the four mold-use binder composition aqueous solutions 2-2 prepared beforehand. The resulting mixtures were mixed to obtain four mixed sands. Each mixed sand was packed in a test piece frame for gas curing which has a diameter of 50 mm and a height of 50 mm, and methyl formate was injected thereinto in each of the amounts shown in Table 2-5 per 100 parts by weight of the silica sand to thereby produce a mold by the gas curing method. The molds thus obtained were evaluated for compression strength (kg/cm²) after 24 hours and other properties. The results obtained are shown in Table 2-5. In Table 2-5, the kinds of bisphenols and others are specified as in Table 2-1.

COMPARATIVE EXAMPLES 16 TO 19

Molds were obtained in the same manner as in Example 40 except that in place of the mold-use binder composition aqueous solution 2-2, the mold-use binder composition aqueous solution 2-6 (Comparative Example 16), the mold-use binder composition aqueous solution 2-7 (Comparative Example 17), or a mixture of the mold-use binder composition aqueous solutions 2-6 and 2-7 (Comparative Examples 18 and 19). The molds obtained were evaluated for compression strength (kg/cm²) after 24 hours and other properties in the same manner as in Example 22. The results obtained are also shown in Table 2-5.

TABLE 2-5

| Example | Phenolic Compound | Bisphenol | Aldehyde Compound | Molar Ratio c | Molar Ratio d | Hardener Amount (parts by weight) | Compression Strength | Degree of Strength Decrease (%) |
|---|---|---|---|---|---|---|---|---|
| Example 40 | phenol | bisphenol A | formaldehyde | 2.0 | 0.400 | 1.2 | 38.5 | 21.3 |
|  |  |  |  |  |  | 0.6 | 30.3 |  |
| Example 41 | p-tert-butylphenol | " | " | 2.0 | 50 | 1.2 | 38.7 | 22.7 |
|  |  |  |  |  |  | 0.6 | 29.9 |  |
| Example 42 | m-cresol | bisphenol F | " | 2.0 | 100 | 1.2 | 41.2 | 23.8 |
|  |  |  |  |  |  | 0.6 | 31.4 |  |
| Example 43 | phenol | bisphenol A | formaldehyde/furfuryl = 9/1 | 2.0 | 0.400 | 1.2 | 23.1 | 21.2 |
|  |  |  |  |  |  | 0.6 | 18.2 |  |
| Comparative Example 16 | phenol | — | formaldehyde | 1.5 | — | 1.2 | 35.5 | 23.9 |
|  |  |  |  |  |  | 0.6 | 27.0 |  |
| Comparative Example 17 | — | bisphenol A | " | 3.0 | — | 1.2 | 43.1 | 53.6 |
|  |  |  |  |  |  | 0.6 | 20.0 |  |
| Comparative Example 18 | Phenol-aldehyde resin comprising a mixture of 100 parts by weight of the resin of Comparative Example 16 and 25 parts by weight of the resin of Comparative Example 17 | | | | | 1.2 | 39.1 | 33.2 |
|  |  |  |  |  |  | 0.6 | 26.1 |  |
| Comparative Example 19 | Phenol-aldehyde resin comprising a mixture of 100 parts by weight of the resin of Comparative Example 16 and 400 parts by weight of the resin of Comparative Example 17 | | | | | 1.2 | 40.2 | 49.0 |
|  |  |  |  |  |  | 0.6 | 20.5 |  |

EXAMPLES 44 TO 47

To 100 parts by weight of silica sand (sand temperature: 35° C.) as a refractory particulate material was added 3.0 parts by weight of each of the four mold-use binder composition aqueous solutions 2-3 prepared beforehand. The resulting mixtures were mixed to obtain four mixed sands. Each mixed sand was packed in a test piece frame for gas curing which has a diameter of 50 mm and a height of 50 mm, and carbon dioxide gas was passed therethrough at a flow rate of 10 l/min for each of the time periods (min.) shown in Table 2-6 to thereby produce a mold by the gas curing method. The molds were evaluated for compression strength (kg/cm²) after 24 hours and other properties in the same manner as in Example 22. The results obtained are shown in Table 2-6. In Table 2-6, the kinds of bisphenols and others are specified as in Table 2-2.

COMPARATIVE EXAMPLES 20 TO 23

Molds were obtained in the same manner as in Example 44 except that in place of the mold-use binder composition aqueous solution 2-3, the mold-use binder composition aqueous solution 2-8 (Comparative Example 20), the mold-use binder composition aqueous solution 2-9 (Comparative Example 21), and a mixture of the mold-use binder composition aqueous solutions 2-8 and 2-9 (Comparative Examples 22 and 23) was used. The molds obtained were evaluated for compression strength (kg/cm$^2$) after 24 hours and other properties in the same manner as in Example 22. The results obtained are also shown in Table 2-6.

strength than the molds obtained by the methods of Comparative Examples 12 to 23, even when a small hardener amount was used.

[Preparation of Mold-use Binder Composition Aqueous Solutions 3-1]

To a 50% aqueous solution of potassium hydroxide were added a phenol compound and a polyhydric phenol in respective amounts determined by the molar ratio shown in

TABLE 2-6

| Example | Phenolic Compound | Bisphenol | Aldehyde Compound | Molar Ratio c | Molar Ratio d | hardener Amount (parts by weight) | Compression Strength | Degree of Strength Decrease (%) |
|---|---|---|---|---|---|---|---|---|
| Example 44 | phenol | bisphenol A | formaldehyde | 2.0 | 0.400 | 2.0 | 27.0 | 19.6 |
|  |  |  |  |  |  | 0.5 | 21.7 |  |
| Example 45 | p-tert-butylphenol | " | " | 2.0 | 50 | 2.0 | 30.2 | 22.5 |
|  |  |  |  |  |  | 0.5 | 23.4 |  |
| Example 46 | m-cresol | bisphenol F | " | 2.0 | 100 | 2.0 | 31.8 | 23.3 |
|  |  |  |  |  |  | 0.5 | 24.4 |  |
| Example 47 | phenol | bisphenol A | formaldehyde/furfural = 9/1 | 2.0 | 0.400 | 2.0 | 25.7 | 18.7 |
|  |  |  |  |  |  | 0.5 | 20.9 |  |
| Comparative Example 20 | phenol | — | formaldehyde | 1.5 | — | 2.0 | 20.1 | 22.9 |
|  |  |  |  |  |  | 0.5 | 15.5 |  |
| Comparative Example 21 | — | bisphenol A | " | 2.0 | — | 2.0 | 23.3 | 49.4 |
|  |  |  |  |  |  | 0.5 | 11.8 |  |
| Comparative Example 22 | Phenol-aldehyde resin comprising a mixture of 100 parts by weight of the resin of Comparative Example 20 and 25 parts by weight of the resin of Comparative Example 21 |  |  |  |  | 2.0 | 21.6 | 31.5 |
|  |  |  |  |  |  | 0.5 | 14.8 |  |
| Comparative Example 23 | Phenol-aldehyde resin comprising a mixture of 100 parts by weight of the resin of Comparative Example 20 and 400 parts by weight of the resin of Comparative Example 21 |  |  |  |  | 2.0 | 22.8 | 46.5 |
|  |  |  |  |  |  | 0.5 | 12.2 |  |

The results in Tables 2-1 and 2-2 clearly show that when an alkaline phenol-aldehyde resin which is a ternary polymer obtained by the copolycondensation of the three kinds of compounds, i.e., a phenolic compound, a bisphenol, and an aldehyde compound, is used as the main component of a binder composition to produce molds, the resulting molds have an improved compression strength as compared with the case of using a binder composition comprising, as its main component, a phenol-formaldehyde or bisphenol-formaldehyde resin which is a binary polymer obtained by the polycondensation of formaldehyde and either one phenol or one bisphenol or a mixture of the two resins. The results further show that the molds obtained are lower in the degree of compression strength decrease with a decrease in sand temperature. Thus, the molds obtained by the methods of Examples 22 to 29 are higher in compression strength and lower in the degree of compression strength decrease with decreasing sand temperature than the molds obtained by the methods of Comparative Examples 4 to 11. Further, the results in Tables 2-3 to 2-6 clearly show that the molds obtained using the mold-use binder composition aqueous solutions according to the Examples are lower in the degree of compression strength decrease than the molds obtained using the mold-use binder composition aqueous solutions according to the Comparative Examples, even when the hardener amount was small. Thus, the molds obtained by the methods of Examples 30 to 47 are higher in compression Table 3-1. The resulting mixture was stirred to dissolve the compounds. While this solution was maintained at 70° C., an aldehyde compound was gradually added in an amount determined by the molar ratio shown in Table 3-1. The reaction was then continued at 70° C. until the weight-average molecular weight of the alkaline phenol-aldehyde resin in the reaction mixture reached 2,500. The time at which the weight-average molecular weight had reached 2,500 was determined from measurements of the viscosity of the reaction mixture. After the completion of the reaction, the reaction mixture was cooled to room temperature, and 50% aqueous potassium hydroxide solution was then added in such an amount that the ratio of the molar amount of the potassium hydroxide to the total molar amount of the phenol compound and the polyhydric phenol became 0.85. Thus, an alkaline aqueous solution of an alkaline phenol-aldehyde resin was obtained. To this aqueous solution was added 0.5 part by weight of γ-glycidoxypropyltrimethoxysilane per 100 parts by weight of the solution. In the manner described above, six mold-use binder composition aqueous solutions were prepared. In each binder composition aqueous solution, the content of the binder composition (the alkaline phenol-aldehyde resin and the silane coupling agent) was 50% by weight.

TABLE 3-1

| Example | Phenol Compound | Polyhydric Phenol | Aldehyde Compound | Molar Ratio e | Molar Ratio f | Compression Strength of Mold After 0.5 hr | Compression Strength of Mold After 24 hr |
|---|---|---|---|---|---|---|---|
| Example 48 | phenol | resorcinol | formaldehyde | 3.0 | 0.001 | 6.2 | 33.2 |
| Example 49 | " | " | " | 1.5 | 0.400 | 7.2 | 36.2 |

TABLE 3-1-continued

| Example | Phenol Compound | Polyhydric Phenol | Aldehyde Compound | Molar Ratio e | f | Compression Strength of Mold After 0.5 hr | After 24 hr |
|---|---|---|---|---|---|---|---|
| Example 50 | " | " | " | 1.5 | 990 | 9.2 | 39.2 |
| Example 51 | " | catechol | formaldehyde/furfural = 9/1 | 2.0 | 50 | 8.9 | 35.8 |
| Example 52 | m-cresol | resorcinol | formaldehyde | 2.0 | 50 | 10.2 | 37.2 |
| Example 53 | 3,5-xylenol | hydroquinone | " | 2.0 | 0.600 | 7.3 | 35.2 |
| Comparative Example 24 | phenol | — | " | 1.5 | — | 2.2 | 20.4 |
| Comparative Example 25 | — | resorcinol | " | 1.5 | — | 9.3 | 30.2 |
| Comparative Example 26 | Phenol-aldehyde resin comprising a mixture of 100 parts by weight of the resin of Comparative Example 24 and 25 parts by weight of the resin of Comparative Example 25 | | | | | 3.9 | 24.8 |
| Comparative Example 27 | Phenol-aldehyde resin comprising a mixture of 100 parts by weight of the resin of Comparative Example 24 and 400 parts by weight of the resin of Comparative Example 25 | | | | | 5.1 | 26.4 |

In Table 3-1, the item e indicates the ratio of the molar amount of the aldehyde compound to the total molar amount of the phenol compound and the polyhydric phenol, i.e., ((the molar amount of the aldehyde compound)/(the molar amount of the phenol compound+the molar amount of the polyhydric phenol)). The item f indicates the ratio of the molar amount of the polyhydric phenol to that of the phenol compound, i.e., ((the molar amount of the polyhydric phenol)/(the molar amount of the phenol)). The e's and f's appearing in the tables that will be given hereinafter are as defined above.

[Preparation of Mold-use Binder Composition Aqueous Solutions 3-2]

Six mold-use binder composition aqueous solutions 3-2 were prepared by the same method as that for the mold-use binder composition aqueous solutions 3-1 except that the reaction was continued until the weight-average molecular weight of the alkaline phenol-aldehyde resin in the reaction mixture reached 1,800.

[Preparation of Mold-use Binder Composition Aqueous Solutions 3-3]

A 25 parts by weight portion of each of the aqueous solutions of an alkaline phenol-aldehyde resin which had been obtained after the completion of the reaction in the preparation of the mold-use binder composition aqueous solutions 3-2 was mixed with 5 parts by weight of sodium tetraborate decahydrate and 5 parts by weight of 50% potassium hydroxide. Thus, six mold-use binder composition aqueous solutions 3-3 were obtained.

[Preparation of Mold-use Binder Composition Aqueous Solution 3-4]

Phenol was added to a 50% aqueous solution of potassium hydroxide and dissolved therein with stirring. While this solution was maintained at 70° C., formaldehyde was gradually added in such an amount that the ratio of the molar amount of the formaldehyde to that of the phenol became 1.5. The reaction was then continued at 70° C. until the weight-average molecular weight of the phenol-formaldehyde resin in the reaction mixture reached 2,500. The time at which the weight-average molecular weight had reached 2,500 was judged from measurements of the viscosity of the reaction mixture. After the completion of the reaction, the reaction mixture was cooled to room temperature, and 50% aqueous potassium hydroxide solution was then added in such an amount that the ratio of the molar amount of the potassium hydroxide to that of the phenol became 0.85. Thus, an alkaline aqueous solution of a phenol-formaldehyde resin was obtained. To this aqueous solution was added 0.5 part by weight of γ-glycidoxypropyltrimethoxysilane per 100 parts by weight of the solution. In this way, one mold-use binder composition aqueous solution was prepared. In the binder composition aqueous solution, the content of the binder composition (the phenol-aldehyde resin and the silane coupling agent) was 50% by weight.

[Preparation of Mold-use Binder Composition Aqueous Solution 3-5]

Resorcinol was added to a 50% aqueous solution of potassium hydroxide and dissolved therein with stirring. While this solution was maintained at 60° C., formaldehyde was gradually added in such an amount that the ratio of the molar amount of the formaldehyde to that of the resorcinol became 1.5. The reaction was then continued at 60° C. until the weight-average molecular weight of the resorcinol-formaldehyde resin in the reaction mixture reached 2,500. The time at which the weight-average molecular weight had reached 2,500 was determined from measurements of the viscosity of the reaction mixture. After the completion of the reaction, the reaction mixture was cooled to room temperature, and 50% aqueous potassium hydroxide solution was then added in such an amount that the ratio of the molar amount of the potassium hydroxide to that of the resorcinol became 0.85. Thus, an alkaline aqueous solution of a resorcinol-formaldehyde resin was obtained. To this aqueous solution was added 0.5 part by weight of γ-glycidoxypropyltrimethoxysilane per 100 parts by weight of the solution. In this way, one mold-use binder composition aqueous solution was prepared. In the aqueous binder composition solution, the content of the binder composition (the resorcinol-aldehyde resin and the silane coupling agent) was 50% by weight.

[Preparation of Mold-use Binder Composition Aqueous Solution 3-6]

One mold-use binder composition aqueous solution 3-6 was prepared by the same method as that for the mold-use binder composition aqueous solution 3-4 except that the reaction was continued until the weight-average molecular weight of the phenol-aldehyde resin in the reaction mixture reached 1,800.

[Preparation of Mold-use Binder Composition Aqueous Solution 3-7]

One mold-use binder composition aqueous solution 3-7 was prepared by the same method as that for the mold-use binder composition aqueous solution 3-5 except that the reaction was continued until the weight-average molecular weight of the resorcinol-aldehyde resin in the reaction mixture reached 1,800.

[Preparation of Mold-use Binder Composition Aqueous Solution 3-8]

A 25 parts by weight portion of the phenol-formaldehyde resin aqueous solution obtained after the completion of the reaction in the preparation of the mold-use binder composition aqueous solution 3-6 was mixed with 5 parts by weight of sodium tetraborate decahydrate and 5 parts by weight of 50% potassium hydroxide. Thus, one mold-use binder composition aqueous solution 3-8 was obtained.

[Preparation of Mold-use Binder Composition Aqueous Solution 3-9]

A 25 parts by weight portion of the resorcinol-formaldehyde resin aqueous solution obtained after the completion of the reaction in the preparation of the mold-use binder composition aqueous solution 3-7 was mixed with 5 parts by weight of sodium tetraborate decahydrate and 5 parts by weight of 50% potassium hydroxide. Thus, one mold-use binder composition aqueous solution 3-9 was obtained.

EXAMPLES 48 TO 53

To 100 parts by weight of silica sand as a refractory particulate material was added 0.3 part by weight of triacetin as a hardener. The resulting mixture was mixed. Thereto was then added 1.5 parts by weight of each of the six mold-use binder composition aqueous solutions 1 prepared beforehand. The resulting mixtures were mixed to obtain six mixed sands. Each mixed sand was packed in a test piece frame having a diameter of 50 mm and a height of 50 mm to thereby produce a mold by the self-curing method. The molds thus obtained were evaluated for compression strength (kg/cm$^2$) after being allowed to stand for 0.5 hour (referred to as "after 0.5 h" in Table 3-1) and for compression strength (kg/cm$^2$) after being allowed to stand for 24 hours (referred to as "after 24 h" in Table 3-1). The results obtained are shown in Table 3-1.

COMPARATIVE EXAMPLES 24 TO 27

Molds were obtained in the same manner as in Example 48 except that in place of the mold-use binder composition aqueous solution 3-1, the mold-use binder composition aqueous solution 3-4 (Comparative Example 24), the mold-use binder composition aqueous solution 3-5 (Comparative Example 25), or a mixture of the mold-use binder composition aqueous solutions 3-4 and 3-5 (Comparative Examples 26 and 27) was used. The molds obtained were evaluated for compression strength (kg/cm$^2$) in the same manner as in Example 48. The results obtained are also shown in Table 3-1.

EXAMPLES 54 TO 59

To 100 parts by weight of silica sand as a refractory particulate material was added 2.0 parts by weight of each of the six mold-use binder composition aqueous solutions 3-2 prepared beforehand. The resulting mixtures were mixed to obtain six mixed sands. Each mixed sand was packed in a test piece frame for gas curing which has a diameter of 50 mm and a height of 50 mm, and methyl formate was injected thereinto in an amount of 0.8 part by weight per 100 parts by weight of the silica sand to thereby produce a mold by the gas curing method. The molds thus obtained were evaluated for compression strength (kg/cm$^2$) after being allowed to stand for 1 minute (referred to as "after 1 min" in Table 3-2) and for compression strength (kg/cm$^2$) after being allowed to stand for 24 hours (referred to as "after 24 h" in Table 3-2). The results obtained are shown in Table 3-2. In Table 3-2, the kinds of the phenol compounds and others are specified as in Table 3-1.

COMPARATIVE EXAMPLES 28 TO 31

Molds were obtained in the same manner as in Example 54 except that in place of the mold-use binder composition aqueous solution 3-2, the mold-use binder composition aqueous solution 3-6 (Comparative Example 28), the mold-use binder composition aqueous solution 3-7 (Comparative Example 29), or a mixture of the mold-use binder composition aqueous solutions 3-6 and 3-7 (Comparative Examples 30 and 31) was used. The molds obtained were evaluated for compression length (kg/cm$^2$) in the same manner as in Example 48. The results obtained are also shown in Table 3-2.

TABLE 3-2

| Example | Phenol Compound | Polyhydric Phenol | Aldehyde Compound | Molar Ratio | | Compression Strength of Mold | |
|---|---|---|---|---|---|---|---|
| | | | | e | f | After 1 min. | After 24 hr. |
| Example 54 | phenol | resorcinol | formaldehyde | 3.0 | 0.001 | 40.2 | 50.8 |
| Example 55 | " | " | " | 1.5 | 0.400 | 41.1 | 52.1 |
| Example 56 | " | " | " | 1.5 | 990 | 43.5 | 53.4 |
| Example 57 | " | catechol | formaldehyde/furfural = 9/1 | 2.0 | 50 | 39.2 | 49.6 |
| Example 58 | m-cresol | resorcinol | formaldehyde | 2.0 | 50 | 43.4 | 53.8 |
| Example 59 | 3,5-xylenol | hydroquinone | " | 2.0 | 0.600 | 38.8 | 48.2 |
| Comparative Example 28 | phenol | — | " | 1.5 | — | 33.6 | 38.3 |
| Comparative Example 29 | — | resorcinol | " | 1.5 | — | 38.1 | 40.2 |
| Comparative Example 30 | Phenol-aldehyde resin comprising a mixture of 100 parts by weight of the resin of Comparative Example 28 and 25 parts by weight of the resin of Comparative Example 29 | | | | | 35.2 | 38.8 |
| Comparative Example 31 | Phenol-aldehyde resin comprising a mixture of 100 parts by weight of the resin of Comparative Example 28 and 400 parts by weight of the resin of Comparative Example 29 | | | | | 36.9 | 38.7 |

EXAMPLES 60 TO 65

To 100 parts by weight of silica sand as a refractory particulate material was added 3.0 parts by weight of each of the six mold-use binder composition aqueous solutions 3-3 prepared beforehand. The resulting mixtures were mixed to obtain six mixed sands. Each mixed sand was packed in a test piece frame for gas curing which has a diameter of 50 mm and a height of 50 mm, and carbon dioxide gas was passed therethrough for 2 minutes at a flow rate of 10 l/min to thereby produce a mold by the gas curing method. The molds were evaluated for compression strength (kg/cm$^2$) in the same manner as in Example 54. The results obtained are shown in Table 3-3. In Table 3-3, the kinds of the phenol compounds and others are specified as in Table 3-1.

COMPARATIVE EXAMPLES 32 TO 35

Molds were obtained in the same manner as in Example 60 except that in place of the mold-use binder composition aqueous solution 3-3, the mold-use binder composition aqueous solution 3-8 (Comparative Example 32), the mold-use binder composition aqueous solution 3-9 (Comparative Example 33), or a mixture of the mold-use binder composition aqueous solutions 3-8 and 3-9 (Comparative Examples 34 and 35) was used. The molds obtained were evaluated for compression strength (kg/cm$^2$) in the same manner as in Example 48. The results obtained are also shown in Table 3-3.

EXAMPLE 66

Mold-use binder composition aqueous solutions were prepared by the same manner as in the mold-use binder aqueous solution 2-1 except that isopropyl alcohol was added in such an amount that the ratio of the molar amount of isopropyl alcohol to the total molar amount of the phenolic compound and the bisphenol is 0.005.

When mixed sands were prepared in the same manner as in Examples 1 to 7 with using the mold-use binder composition aqueous solution thus obtained and evaluated for their flowabilities and filling properties, they showed good results.

As described above, when the mold-use binder composition of the present invention, which contains a specific alkaline phenol-aldehyde resin as the main component, is used and mixed with a refractory particulate material to obtain a mixed sand, the resulting mixed sand is excellent in flowability and pattern-filling property. Since sufficient mixing is possible when a mixed sand with excellent flowability is used, the binder composition and the refractory particulate material can be uniformly mixed. Further, the mixed sand can be densely packed in a pattern and is hence capable of preventing the resulting mold from having a rough surface or impaired surface strength. Therefore, when casts are

TABLE 3-3

| Example | Phenol Compound | Polyhydric Phenol | Aldehyde Compound | Molar Ratio e | f | Compression Strength of Mold After 1 min. | After 24 hr |
|---|---|---|---|---|---|---|---|
| Example 60 | phenol | resorcinol | formaldehyde | 3.0 | 0.001 | 18.2 | 30.8 |
| Example 61 | " | " | " | 1.5 | 0.400 | 20.1 | 31.4 |
| Example 62 | " | " | " | 1.5 | 990 | 23.8 | 33.7 |
| Example 63 | " | catechol | formaldehyde/furfural = 9/1 | 2.0 | 50 | 19.2 | 29.5 |
| Example 64 | m-cresol | resorcinol | formaldehyde | 2.0 | 50 | 20.2 | 33.7 |
| Example 65 | 3,5-xylenol | hydroquinone | " | 2.0 | 0.600 | 18.9 | 28.3 |
| Comparative Example 32 | phenol | — | " | 1.5 | — | 10.3 | 20.8 |
| Comparative Example 33 | — | resorcinol | " | 1.5 | — | 18.8 | 22.3 |
| Comparative Example 34 | Phenol-aldehyde resin comprising a mixture of 100 parts by weight of the resin of Comparative Example 32 and 25 parts by weight of the resin of Comparative Example 33 | | | | | 11.1 | 20.9 |
| Comparative Example 35 | Phenol-aldehyde resin comprising a mixture of 100 parts by weight of the resin of Comparative Example 32 and 400 parts by weight of the resin of Comparative Example 33 | | | | | 15.2 | 21.2 |

The results in Tables 3-1 to 3-3 clearly show that when an alkaline phenol-aldehyde resin which is a ternary polymer obtained by the copolycondensation of the three kinds of compounds, i.e., a phenol compound, a polyhydric phenol, and an aldehyde compound, is used as the main component of a binder composition to produce molds, the resulting molds obtained have an improved compression strength as compared with the case of using a binder composition comprising, as its main component, a phenol-formaldehyde resin which is a binary polymer obtained by the polycondensation of phenol and formaldehyde, a polyhydric phenol-formaldehyde resin which is a binary polymer obtained by the polycondensation of a polyhydric phenol and formaldehyde, or a mixture of the two resins. Thus, the molds obtained by the methods of Examples 48 to 65 are higher in initial compression strength and in compression strength measured after the lapse of a certain time period than the molds obtained by the methods of Comparative Examples 24 to 35.

produced with a mold obtained using the mold-use binder composition according to the present invention, the occurrence of cast defects such as sand inclusion, burning, penetration, and buckle can be prevented, thus the effect of preventing a decrease in cast quality are attained.

Further, use of the mold-use binder composition of the present invention by mixing it with a refractory particulate to obtain a mold can improve the compression strength of the mold as compared with the case of using conventional binder compositions containing a phenol-formaldehyde resin and/or a bisphenol-formaldehyde resin as the main component. Therefore, when casting is conducted with a mold obtained using the mold-use binder composition according to the present invention, the mold surface is less apt to be eroded during melt pouring, thus the effect of giving a cast of excellent quality are attained.

Moreover, use of the mold-use binder composition of the present invention enables the production of a mold with a high compression strength even when the refractory particulate material has a low temperature or a hardener is used in a small amount. It is therefore possible to avoid the necessity of warming the refractory particulate material prior to mold production, so that the mold production process can be simplified. In addition, the energy which has been necessary for warming the refractory particulate material can be made unnecessary or reduced. Furthermore, since the hardener amount to be used can be reduced, the cost of hardener can be lowered. Consequently, use of the mold-use binder composition of the present invention produces the effect of enabling the rationalization of mold production.

Still further, when the mold-use binder composition of the present invention is used and mixed with a refractory particulate material to obtain a mold, the mold is improved not only in initial compression strength but in compression strength measured after the lapse of a certain time period as compared with the case of using conventional phenolic resins such as phenol-formaldehyde resins. Therefore, when casting is conducted with a mold obtained using the mold-use binder composition according to the present invention, the mold surface is less apt to be eroded during melt pouring, thus the effect of giving a cast of excellent quality are attained. Moreover, the mold-use binder composition of the present invention enables the production of a mold with a high compression strength even when the binder composition is used in a small amount. Since the binder amount in a mold can thus be reduced, the amount of a gas which generates during melt pouring due to the presence of a binder can be reduced, thus the effect of enabling the production of molds having few gas-caused defects are attained.

While the invention has been described in detail and with reference to specific embodiments thereof, it will be apparent to one skilled in the art that various changes and modifications can be made therein without departing from the spirit and scope thereof.

What is claimed is:

1. A method for producing a mold which comprises mixing a refractory particulate material with a binder composition which is a 30 to 75 wt % aqueous composition which consists essentially of an alkaline phenol-aldehyde resin which is curable with an organic ester and which is obtained by copolycondensation of a phenolic compound represented by the following formula (1), (2) or (3), a bisphenol represented by the following formula (4), and at least one aldehyde compound selected from the group consisting of formaldehyde, paraformaldehyde, furfural and glyoxal:

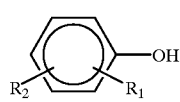
(1)

wherein $R_1$ and $R_2$ each represents hydrogen atom or a hydrocarbon group having 2 or less carbon atoms;

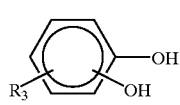
(2)

wherein $R_3$ represents hydrogen atom, hydroxy group or a hydrocarbon group having 2 or less carbon atoms;

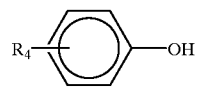
(3)

wherein $R_4$ represents an aliphatic hydrocarbon group or an aromatic hydrocarbon group each having 3 or more carbon atoms; and

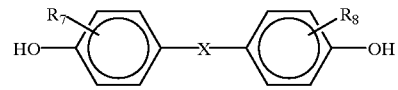
(4)

wherein X represents

S, O, or

where $R_5$ and $R_6$ each represents hydrogen atom, trifluoromethyl group, a saturated or unsaturated alkyl group having 1 to 6 carbon atoms, or phenyl group; and $R_7$ and $R_8$ each represents hydrogen atom, a saturated or unsaturated alkyl group having 1 to 6 carbon atoms, or phenyl group, wherein the ratio of the molar amount of said bisphenol to the molar amount of said phenolic compound is 0.01 to 90 and the ratio of the molar amount of said aldehyde compound to the total molar amount of said phenolic compound and said bisphenol is 1.0 to 5.0, wherein the copolycondensation of the phenolic compound of formula (1), (2) or (3), the bisphenol of formula (4) and the aldehyde is carried out in an alkaline aqueous solution in which the ratio of the molar amount of all alkali(s) to the total molar amount of the hydroxyl groups of the phenolic compound of formula (1), (2) or (3) and the hydroxyl groups of the bisphenol of formula (4) is from 0.2 to 1.2.

2. The method for producing a mold as in claim 1, wherein a monohydric alcohol having 2 to 10 carbon atoms is further added in said copolycondensation in such an amount that the ratio of the molar amount of said alcohol to the total molar amount of said phenolic compound and said bisphenol is 0.0001 to 0.5.

* * * * *